April 2, 1968     R. A. JEFFREYS ET AL     3,375,929

CHROMATOGRAPHIC DEVICE

Filed Dec. 16, 1966     2 Sheets-Sheet 1

INVENTORS
ROY A. JEFFREYS
ELIZABETH A. MORRIS
REGINALD B. MORRIS

BY Walter O. Hodsdon
Paul R. Holmes
Henry M. Chapin
ATTORNEYS

April 2, 1968  R. A. JEFFREYS ET AL  3,375,929
CHROMATOGRAPHIC DEVICE

Filed Dec. 16, 1966  2 Sheets-Sheet 2

INVENTORS
ROY A. JEFFREYS
ELIZABETH A. MORRIS
REGINALD B. MORRIS

BY Walter O. Hodsdon
Paul R. Holmes
Henry M. Chapin
ATTORNEYS

United States Patent Office 3,375,929
Patented Apr. 2, 1968

3,375,929
CHROMATOGRAPHIC DEVICE
Roy Arthur Jeffreys, Elizabeth Anne Morris, and Reginald Burford Morris, London, England, assignors to Eastman Kodak Company, Rochester, N.Y., a corporation of New Jersey
Filed Dec. 16, 1966, Ser. No. 602,357
3 Claims. (Cl. 210—198)

ABSTRACT OF THE DISCLOSURE

Apparatus for development of flexible chromatographic elements employed in thin-layer chromatography including a reservoir for eluent and a pair of support plates, for example, rectangular plates constructed of glass, which define a narrow chamber open at only one end enclosing the element and which support the element by means of raised surfaces at each end of the chamber without contact between it and the faces of the support plates so that one end is immersed in the eluent.

---

This invention relates to a device for use in thin layer chromatographic methods.

Chromatographic methods of analysis have been known for many years. As originally proposed, a piece of adsorbent sheet material, such as blotting paper, is marked with one or more spots of the mixture to be analysed, and one edge of the sheet material is dipped in an eluent which then travels through the adsorbent material by capillary action. When the eluent passes the spot of material to be analysed it carries with it the constituents of the material. The rate of diffusion of the constituents in the spot varies from one to another, so that in due course the constituents become separated and individually visible.

It is necessary if reproducible analysis is to be carried out that the adsorbent material be enclosed in a chamber in which the vapour pressure of the eluent is at its saturation point. Consequently, chromatographic analysis is usually carried out in enclosed chambers. So that the saturation state is reached comparatively quickly, there has recently been proposed a device for carrying out chromatographic analysis which, in effect, consists of two glass plates placed face-to-face defining a narrow pocket between them but sealed around three of the four sides. The adsorbent material may consist of an adsorbent layer on one of the glass plates. By placing the open end of this device under the surface of a bath of the eluent, saturation point within the device can quickly be reached.

Another more recent proposal is to employ a device similar to that just described but employing a thin flexible film on which is coated an adsorbent layer and to place this in between the two glass sheets. In this way the chromatographic record can be separated from the device after use and, if desired, stored for record purposes.

One drawback in this last procedure is that it is difficult to avoid flooding of the adsorbent layer from the sides of the device. Eluent tends to get drawn up the sides of the device by capillary attraction whence it floods into the middle of the adsorbent material and interferes with the desired diffusion of eluent from the free end of the adsorbent layer.

It is an objective of the invention to provide a novel chromatographic device for holding a film or other sheet material for chromatographic analysis.

It is a further object of the invention to provide a chromatographic device for thin layer chromatography in which the sheet material is not subject to deleterious flooding, while still providing a thin pocket which can be easily saturated with eluent vapour.

It is a still further object to provide a novel chromatographic unit comprising a reservoir for containing eluent in which the novel chromatographic device can stand upright without the use of extra supports.

Other objects of the invention will appear from the following description of the invention.

These and other objects are accomplished by a chromatographic device comprising two rectangular plates removably held in face-to-face relationship which have cooperating means rendering the device air-tight around three sides, the device containing means for securing the chromatographic film at the closed end of the device, the plates defining a thin open-ended pocket adapted to contain the film during use, and the plates, at the open end of the device, bearing raised portions which prevent the film coming into contact with the surfaces of the plates at least in the immediate vicinity of the raised portions.

Figure 3:
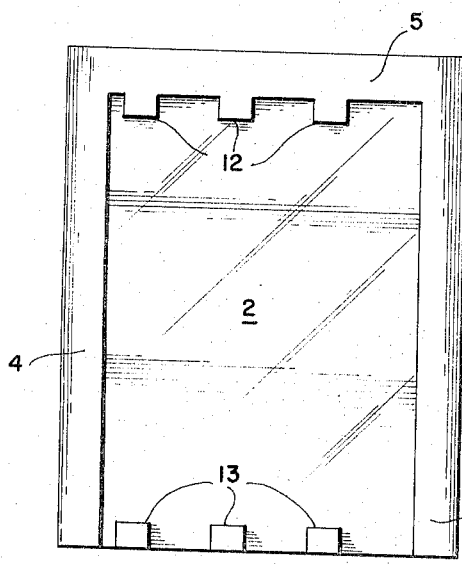
FIGURE 3 illustrates a differently constructed plate.
Figure 4:
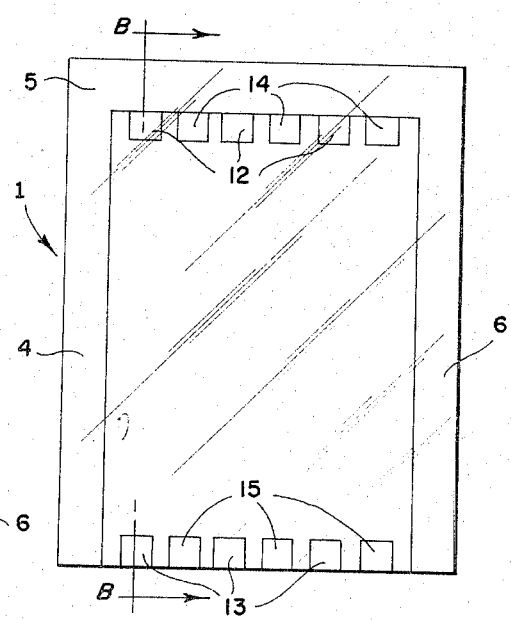
Figure 5:
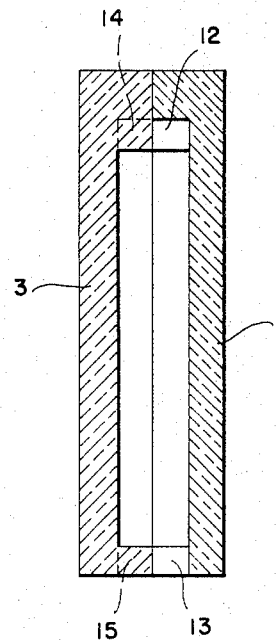
Figure 6:
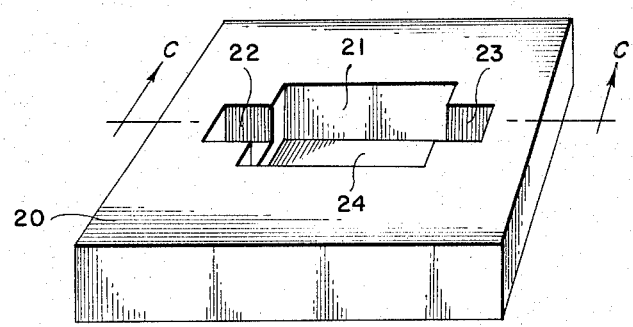
Figure 7:
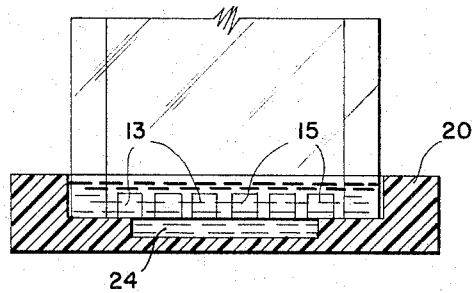

FIGURE 4 illustrates a pair of plates according to FIGURE 3 held in contact to form a chromatographic device according to the invention, FIGURE 5 shows a cross-section along the line B—B of the device shown in FIGURE 4, FIGURE 6 shows a perspective view of a suitable holder for the device of the invention, and FIGURE 7 shows a cross-section of the holder of FIGURE 6 along the line C—C, when holding a device according to FIGURE 4.

Figure 1:
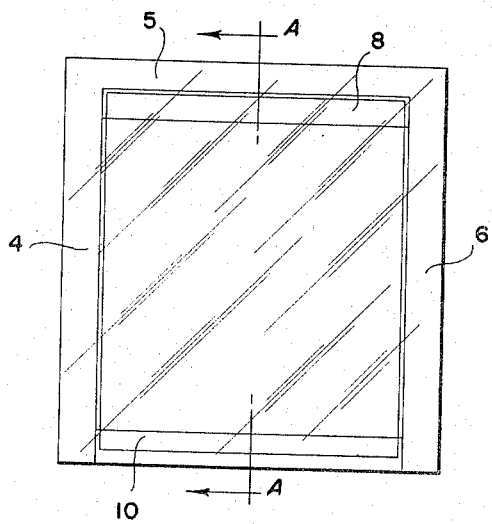
FIGURE 1 shows a side view of one device in accordance with the invention.
Figure 2:
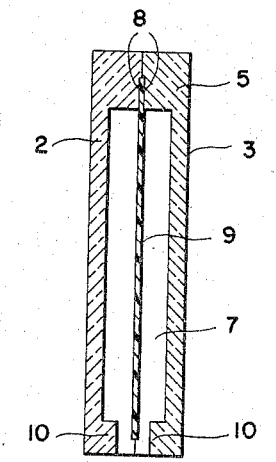
FIGURE 2 shows a cross section through the device of FIGURE 1 along the line A—A.

In FIGURES 1 and 2, the device 1 consists of two facing plates 2 and 3, formed of glass or other rigid plastic material, at least one of the plates preferably being transparent. The plates bear, around three edges thereof, 4, 5 and 6, broad cooperating flanges to render the device airtight, when the plates are held together by clips or other means (not shown). The plates may be moulded or may consist of flat glass plates bearing flat strips bonded thereto around the three edges. For ease of manufacture, it is preferred that plates 2 and 3 be identical.

The device thus defines a thin, open-ended pocket in which a chromatographic film is located when the device is to be used. Recessed portions 8, are provided at the closed end of the device which assist in holding the film 9, in position. The stepped portions may be designed to grip a chromatographic film of standard thickness without any further holding means. If desired, however, a strip of foamed plastic may be attached to one of the stepped portions, and the depth of the step made slightly deeper.

At the open end of the device, there are provided horizontal baffles 10, which serve to maintain the film 9 at a distance from the walls of the plate, at least in the vicinity of the lower end of the plate. The height of the baffles above the plate is not great enough so that they grip the film when in position. Such gripping would hinder the flow of eluent in the chromatographic film.

In operation, a spot of the material to be analysed, or of course, a number of spots, if desired, is deposited towards one end of the adsorbent layer on the chromatographic film. The film is then placed on one of the plates forming the device, the end away from the material to be analysed being placed for gripping by the holding means, the second plate is placed in position, and the plates are secured together by clips or other holding means. The open end of the device is then lowered under the surface of the eluent employed so as to saturate the pocket with eluent vapour. It is preferable in some instance to make the baffles sufficiently deep so that the lower end of the chromatographic film comes part way down the raised portion.

The open end of the device can then first be inserted under the surface of the eluent a comparatively short distance, so that the chromatographic film does not go beneath the surface of the eluent. After the pocket has become saturated with eluent vapour, the device is then lowered further so that the end of the chromatographic film is immersed in the eluent.

The horizontal baffle has a sharp profile pocket side, so that it is not possible for the flexible chromatographic film to remain in contact with the walls of the pocket immediately above the baffle. There is, therefore, always a vapour pocket just above each baffle, which effectively prevents the eluent flooding up the film by capillary action between the film and the plates. Further, the distance between the sides of the pocket, i.e. between 4 and 6 in FIGURE 1, should be slightly wider than the chromatographic film, so that it is not in contact with the sides of the device.

In FIGURES 3, 4 and 5, the device 1 consists of two facing plates 2 and 3. The plates are constructed with broad cooperating flanges 4, 5 and 6, in the same way as the plates in FIGURES 1 and 2. The plates are formed with projections 12, 13, 14 and 15, 12 and 14 being at the top and 13 and 15 being at the bottom of the plates. The projections are spaced regularly but not symmetrically across the end of each plate and are located so that if two identical plates are placed face-to-face with the thin, open-ended pocket between them, the projections 12 on plate 12 lie in between the projections 14 on plate 3. Projections 13 and 15 are similarly spaced.

In operation, a chromatographic film of the type employed in thin film chromatography is placed between the plates so that it is held between the projections 12 and 14 at the top end of the plates and between the projections 13 and 15 at the bottom end of the plates. These projections are at the same height above the plates as the flanges 4, 5 and 6, and therefore hold the film securely during use. It will be appreciated that in practice the film is so thin that it does not affect the airtight seal along the closed end of the device and in fact is bent to only a small degree while still being held securely.

As can be appreciated, the film, when in position in the device, is not in contact with the sides or other parts of the device, except where the projections are located, and it is impossible for the eluent to flood the film either from the bottom or from the sides of the device.

It is possible to employ a chromatographic device as just described with a known type of stand and eluent holder. However, it is preferred to use a holder of the type now to be described.

In FIGURES 6 and 7 a holder 20 contains a trough 21 for holding the eluent. The trough is sufficiently long so that it can contain the plates in a longitudinal position and at least the end portions 22, 23 thereof are sufficiently narrow that they loosely grip the plates and hold them substantially vertical so that the plates do not tend to overbalance when in position. There is preferably a deeper recess 24 in the middle of the trough to act as a reservoir for the eluent. If desired, the middle part of the trough may be wider than the end parts to facilitate addition of eluent or to provide further capacity. In this arrangement, the plates and trough are preferably designed so that the level of eluent in the trough comes above the upper edges of the projections 13 and 15.

The device of the invention may, as suggested above, be formed from glass sheets which may be moulded to the required shapes or may, if desired, be composed of strips of glass stuck on to flat glass plates. Other materials than glass can be employed provided that at least one of the plates is transparent and sufficiently rigid for ease of handling. The chromatographic film may be composed of a film base, such as polyester film, bearing a layer of a binder, such as polyvinyl alcohol, containing silica gel, kieselguhr or any other of the well-known materials employed in chromatographic analysis.

As well known in the art, the materials from which the device and the chromatographic film are constructed should be such that they are inert to the eluent employed.

Suitable chromatographic films for use in the invention are described in the copending application of Perry and Staudenmayer U.S. Serial No. 450,362, filed Apr. 23, 1965.

We claim:
1. An apparatus for development of chromatographic elements which comprise a flexible support carrying a chromatographically active layer, said apparatus comprising a base having a reservoir therein to contain eluent for chromatographic analysis and a pair of support plates removably held within said reservoir by engagement at one end with at least a portion of the walls thereof and positioned in face-to-face relationship; said plates having raised mating edges along both sides and along the end opposite to said reservoir to form a narrow chamber for enclosing said chromatographic element which is airtight on two sides and one end and open at the other end, each of said plates bearing a series of raised portions for gripping said chromatographic element extending across the closed end of said chamber and positioned so as to lie between the corresponding raised portions on the opposing plate, and each of said plates bearing a series of raised portions to prevent said chromatographic element from contacting the faces of said plates extending across the open end of said chamber and positioned so as to lie between the corresponding raised portions on the opposing plate.

2. Apparatus as described in claim 1 wherein said reservoir comprises a generally rectangular chamber having aligned end portions sufficiently narrow to grip said plates and hold them in substantially vertical position and a portion therebetween of greater width than said end portions to facilitate addition of eluent and to provide substantial capacity therefor.

3. Apparatus as described in claim 2 wherein the portion of said chamber between said end portions is of greater depth than said end portions to increase the capacity of said chamber for eluent and to permit the bottom edges of said plates to be spaced from the bottom of said chamber.

References Cited

UNITED STATES PATENTS 3,318,451    5/1967    Przybylowicz et al. __ 210—198

REUBEN FRIEDMAN, *Primary Examiner.*

J. L. DeCESARE, *Assistant Examiner.*